United States Patent [19]

Sims et al.

[11] Patent Number: 4,958,235

[45] Date of Patent: Sep. 18, 1990

[54] SYSTEM AND METHOD FOR RAPIDLY CONVEYING DOCUMENT IMAGES BETWEEN DISTANT LOCATIONS

[75] Inventors: Richard L. Sims, London; Billy S. Baker, Corbin; Randy G. Dotson; Robert J. York, both of Somerset; Joey A. Herrell, London, all of Ky.

[73] Assignee: Appalachian Computer Services, London, Ky.

[21] Appl. No.: 293,923

[22] Filed: Jan. 5, 1989

[51] Int. Cl.$^5$ .............................................. H04N 1/00
[52] U.S. Cl. ................................... 358/402; 358/426
[58] Field of Search ................ 358/402, 403, 426, 407

[56] References Cited

U.S. PATENT DOCUMENTS

| | | | |
|---|---|---|---|
| 4,587,633 | 5/1986 | Wang et al. | 358/403 |
| 4,604,653 | 8/1986 | Shimizu | 358/403 |
| 4,646,160 | 2/1987 | Iizuka et al. | 358/402 |

*Primary Examiner*—Edward L. Coles, Sr.
*Attorney, Agent, or Firm*—Cook, Egan, McFarron & Manzo, Ltd.

[57] ABSTRACT

A system for rapidly conveying images contained on each of a plurality of documents from a first location to a second location distance from the first location at a high transmission rate. The system includes a scanner at the first location for scanning each document to provide digital data representative of the images on each document, and a first data recorder for recording the digital data. The system also includes a first reader also at the first location for reading the digital data from the first storage medium, and transmission means coupled to the first reader for transmitting the serial bit map of the digital data from the first location. Also disclosed is a receiver at the second location for receiving the digital data and a second recorder coupled to the receiver for recording the digital data. There is a second reader at the second location for reading the digital data, and reproduces the images of the documents.

30 Claims, 15 Drawing Sheets

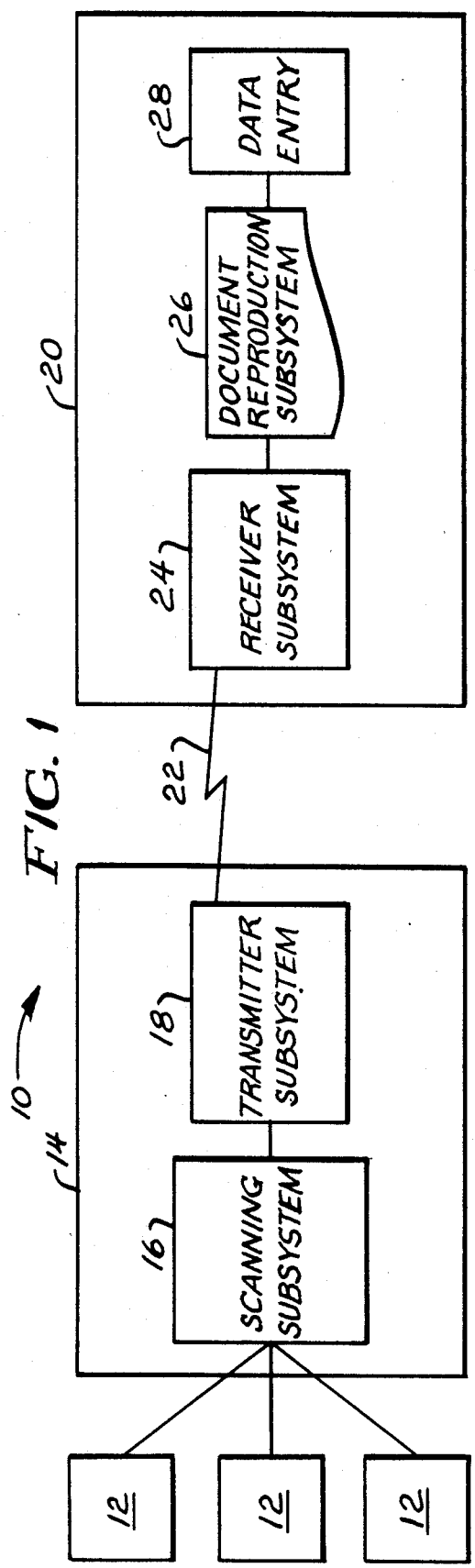
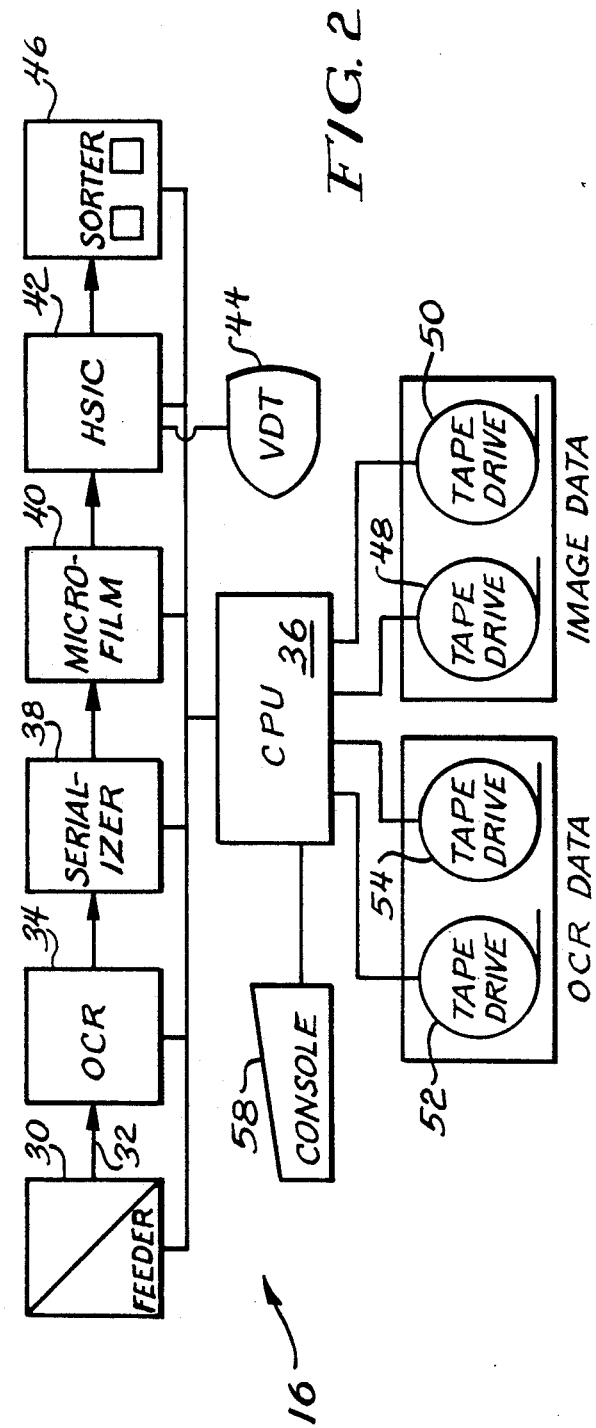

FIG. 6
FIG. 6A
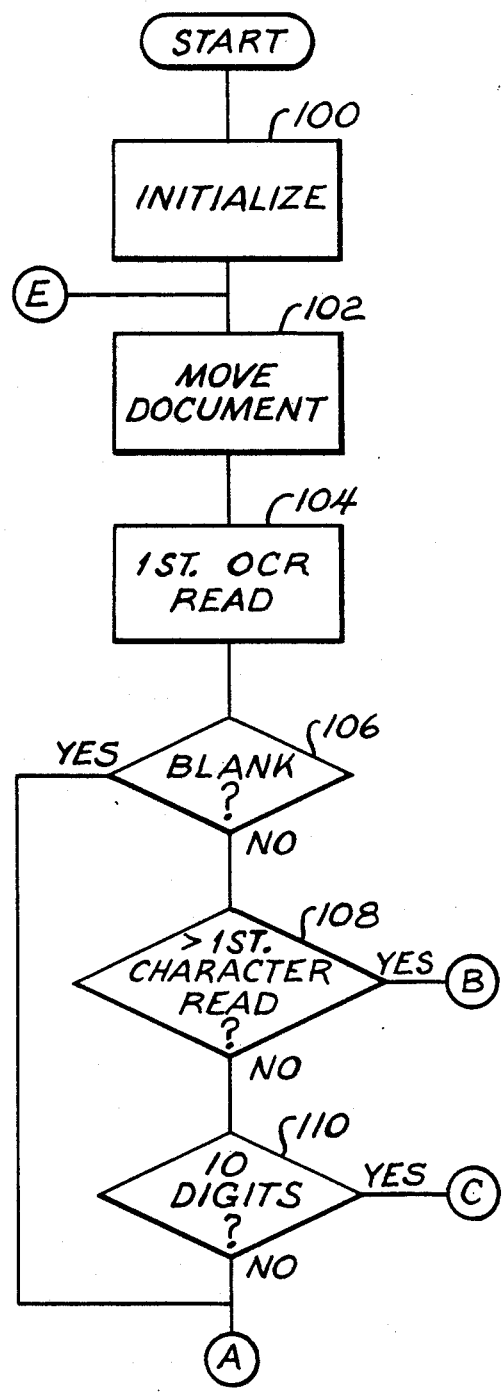
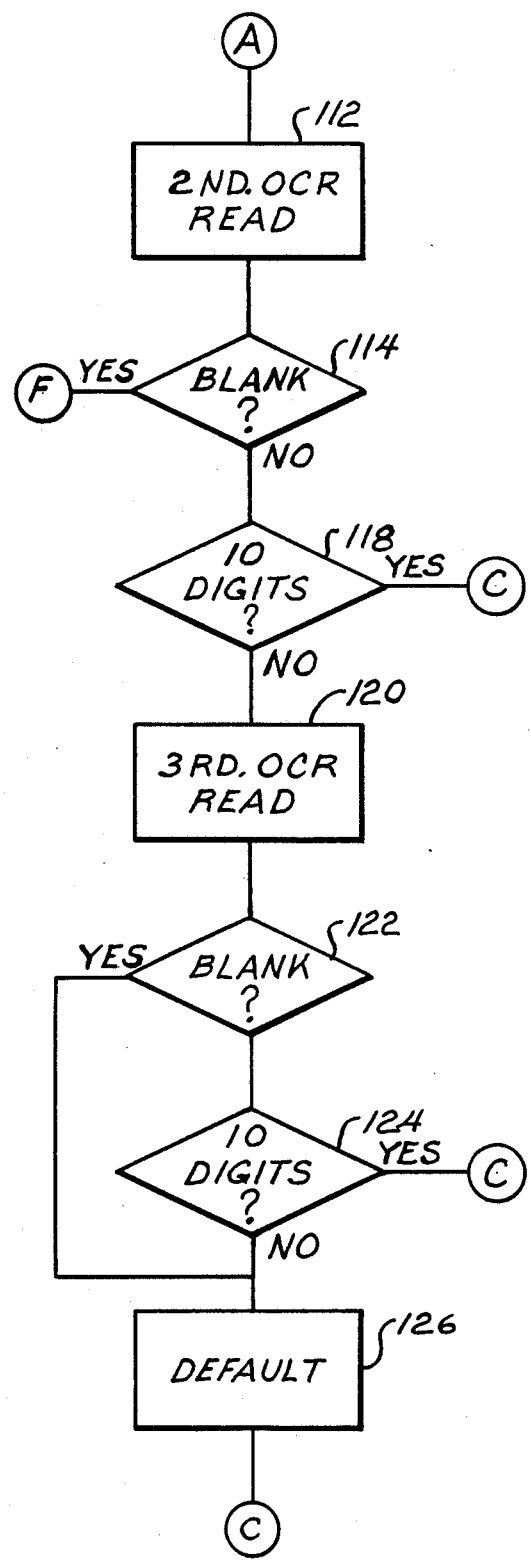

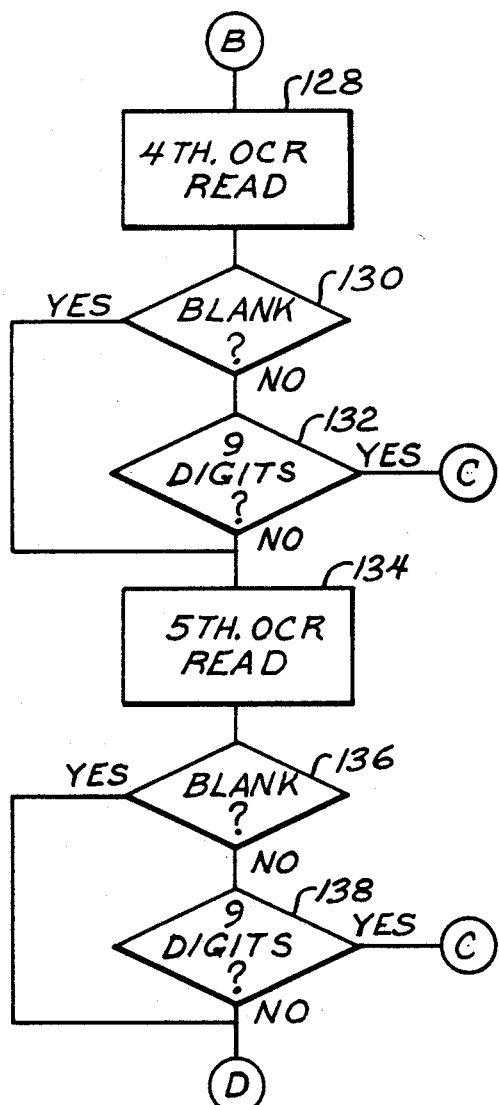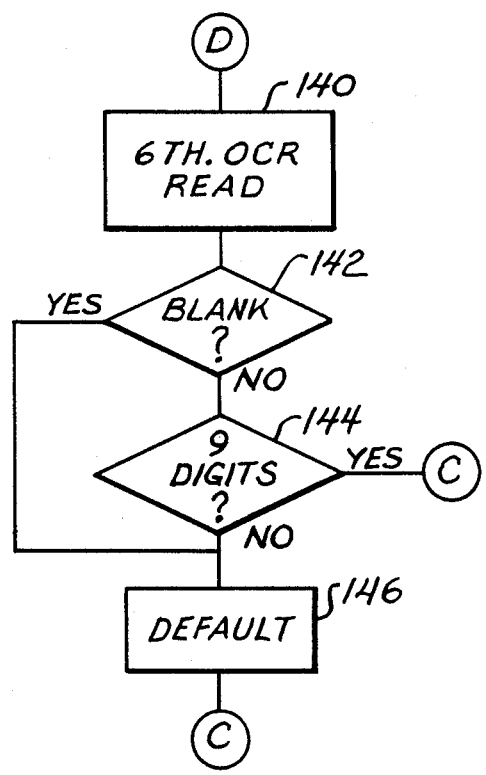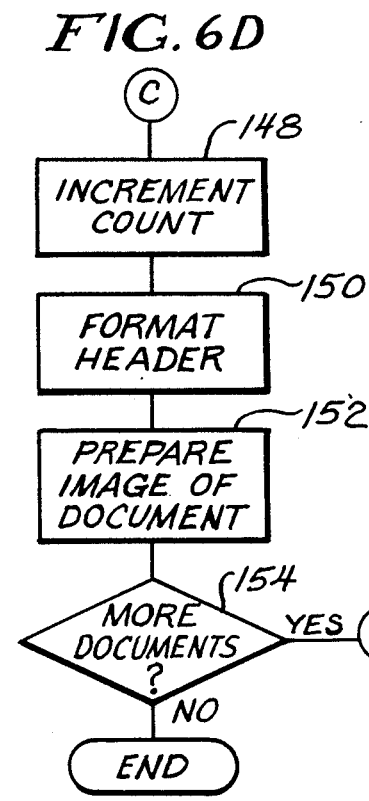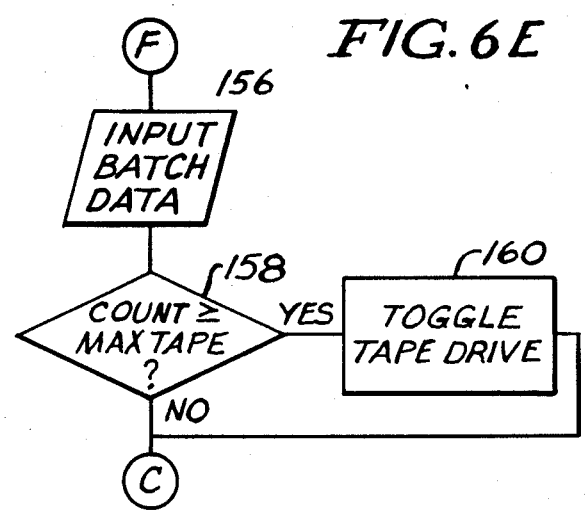

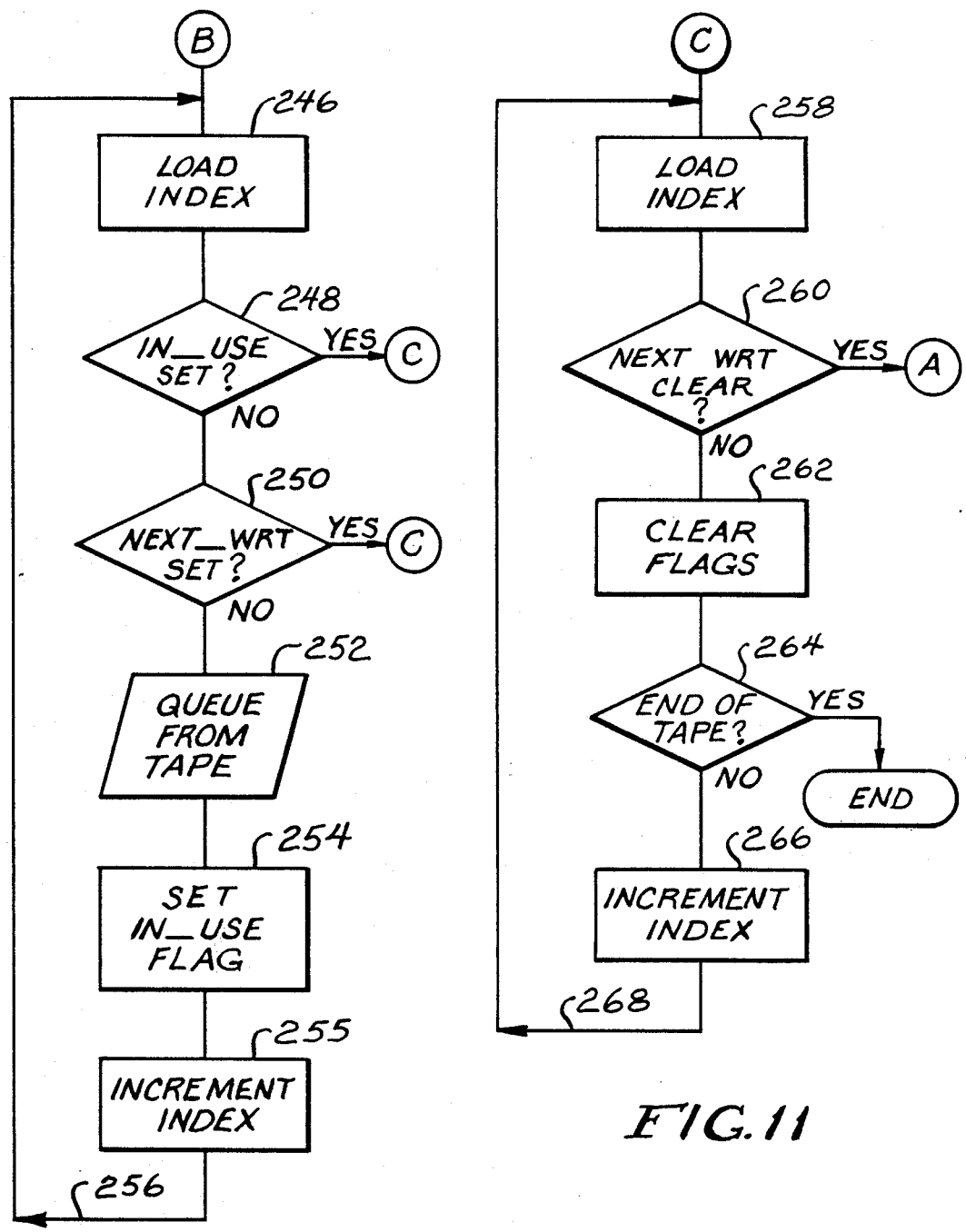

SYSTEM AND METHOD FOR RAPIDLY CONVEYING DOCUMENT IMAGES BETWEEN DISTANT LOCATIONS

BACKGROUND OF THE INVENTION

The present invention generally relates to a system and method for rapidly conveying the images contained on a plurality of documents between distant locations. The invention more particularly relates to a system wherein the documents are scanned one at a time in rapid succession to generate a serial bit map of digital data representative of the images contained on each document, wherein the digital data is transmitted from one location to another where it is received and wherein the digital data is then used to recreate the images contained on the original documents. The present invention finds particular utility in the data conversion field.

Data conversion is the process by which information is converted from one form to another; for example, from hard copy form to digital data form stored on a storage medium such as a memory disk or magnetic recording tape. Data conversion services are utilized in a wide variety of fields, such as in banking, credit card services, overnight package or letter delivery services, and most any other service wherein transactions are first conducted in hard copy form and wherein the hard copy information is required, within a short time thereafter, to be entered into a computer system for recordkeeping, verification, tracking or billing purposes.

As can be appreciated from the above, there is a great need for data conversion services in today's commerce and trade. Many organizations in need of such services however, are either not large enough or unwilling to expend the resources required to perform the data conversion necessary in their businesses within their own organizations. As a result, organizations have hired out such services to companies, such as the assignee of the present invention, which provide data conversion services.

In the past, and up to the present time, companies which provide data conversion services have been regional in nature and have been able to serve only a limited geographical area within a rather close proximity to their data conversion facilities. The regional nature of these businesses has, to a large measure, been caused by the age old problems associated with time and distance which have plagued and limited this industry for years.

Time and distance have been a problem because the businesses which need data conversion require a quick turnaround time from the moment a transaction is entered into to the time when computer input must be made. In the overnight shipping field, for example, it is not uncommon for data conversion to be required within twenty-four hours. Even though literally thousands of hard copies must be data converted, a data conversion facility located near to the point of the transactions can usually handle such a schedule. However, a data conversion facility located just a few hundred miles away does not have enough time to obtain the hard copies, transport them back to the data conversion facility, and then convert the data from hard copy form to a computer usable, or digital, form within the required time.

To overcome the problems associated with time and distance, the data conversion field requires a system and method for rapidly conveying the images contained in hard copy form from a point in close proximity to the place of origination to a distant location at which the hard copy data may be converted to computer digital data form. While facsimile machines are known for transmitting document images from one point to another, these machines are relatively slow requiring about one-half minute to transmit the contents of just one letter-sized document. Given the fact that the information contained on literally thousands of documents, such as airbills for example, must be data converted in less than twenty-four hours, facsimile machines are not suitable for alleviating the problems of time and distance. In addition, facsimile machines do not transmit control data for groups of documents.

SUMMARY OF THE INVENTION

This invention provides a system for rapidly conveying images contained on each of a plurality of documents from a first location to a second location distant from the first location at a high transmission rate. The system includes a scanner at the first location for scanning each document in succession to provide a serial bit map of digital data representative of the images contained on each document, and a first digital data recorder for recording on a first storage medium the serial bit map of the digital data. The system also includes a first reader also at the first location for reading the serial bit map of the digital data from the first storage medium, and transmission means coupled to the first reader for transmitting the serial bit map of the digital data from the first location.

The system also includes a receiver at the second location for receiving the serial bit map of the digital data and a second recorder coupled to the receiver for recording the serial bit map of the digital data on a second storage medium. There is a second reader at the second location for reading the serial bit map of the digital data from the second storage medium which includes means for converting the serial bit map to digital data representative of the images contained on the documents, and means for reproducing the images contained on the documents responsive to the digital data representative of the images.

BRIEF DESCRIPTION OF THE DRAWINGS

FIG. 1 is a block diagram of an overview of a preferred system embodying the present invention, illustrating the various subsystems;

FIG. 2 is a block diagram of the scanning subsystem of this preferred embodiment;

FIGS. 6-6E are flow charts of the scanning program of a preferred embodiment of the present invention;

FIG. 10 is a flow chart of the NO_READ_COMPLETE section of the transmit program of a preferred embodiment of the present invention;

FIG. 11 is a flow chart of the NO_FREE_BUF section of the transmit program of a preferred embodiment of the present invention.

DETAILED DESCRIPTION OF THE PREFERRED EMBODIMENT

Figure 3:
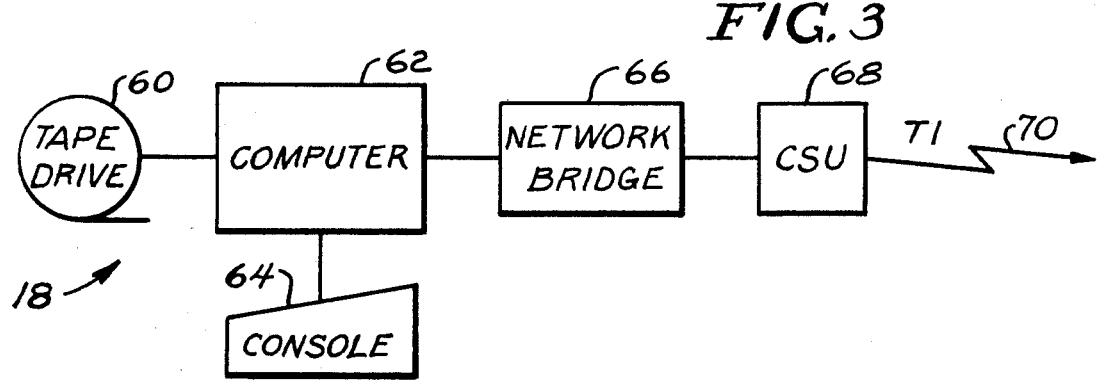
FIG. 3 is a block diagram of the transmitter part of the communication subsystem of a preferred embodiment of the present invention.

The invention, together with the advantages thereof, may best be understood by making reference to the following description, taken in conjunction with the accompanying drawing; wherein the several figures of which like reference characters identify identical elements.

I. System Overview

Turning now to FIG. 1, a block diagram representing the major subsystems of the preferred embodiment of this invention are shown generally at 10. In this embodiment of this invention, a business requiring data entry of documents, for example, overnight express airbills, collects documents in its local offices 12. The documents are transported to a first location 14, wherein a digital image of each document is generated in box 16, and transmitted in box 18 to a second location 20 remote from the first location 14 via communication link 22. The second location 20 receives the digital image at receiver 24, and reproduces the digital image at box 26 in human readable form. Data entry operators then convert the image of the document in box 28, into computer usable form, as is known in the art.

The documents collected at 12 are transported to a first location and placed into a scanning subsystem 16 of this invention. An optical character reader (OCR) in the scanning subsystem optionally reads a control number, such as an airbill number, for example, that may be present on the document. The document may optionally then be imprinted with a sequential serial number and/or microfilmed. The document is then "imaged", which transforms the image of the document, that this, the pattern of light and dark of the face on the document, into a serial bit map. The serial bit map is then separated into logical block, appended to a header/control record and recorded in digital data form, which can, if needed, be easily transported.

The document being scanned is moved out of the scanner, and the next document may be moved in, characters optically read, serialized, microfilmed, imaged and stored, and that document moved out of the scanner. This procedure continues until all of the documents have been scanned and recorded. After all of the documents have been scanned and all of the digital data has been recorded, the digital data is transferred to a transmitter subsystem 18 according to this embodiment for transmission to a second location 20, over a digital data link 22, for data entry.

The data is transmitted to a receiver 24 which may be a mirror image of the transmitter 18 in this preferred embodiment. The digital data is thus received and recorded on a digital recording medium. The data may then be transferred to a document reproduction subsystem 26, where the documents are reproduced in human readable form. The documents thus reproduced are then used in the data entry operations, as well known in the art.

From the foregoing overview, it is apparent that the preferred embodiment includes four major subsystems. The four major subsystems are a scanning subsystem 16, a transmitter subsystem 18 and receiver subsystem 24 and a document reproduction subsystem 26. Each of these subsystems will be described in turn.

The Scanning Subsystem

Turning now to FIG. 2, a block diagram of the major components of a preferred embodiment of the scanning subsystem is shown generally at 16. The scanning subsystem of the preferred embodiment may be a high speed scanning and imaging system, such as the Scan-Optics ReliaReader 540 System, including the Scan-Optics In-Line Inkjet Serializer option, the Microfilming option, the Second Set of Tape Drives option, and the 7300 series High Speed Image Capture Module option, which are all commercially available from Scan-Optics, Inc., 22 Prestige Park Circle, East Hartford, Conn., U.S.A., 06108. Other hardware for scanning, serializing, imaging and storing documents is with keeping with the spirit of this invention.

Documents to be scanned are loaded into a document feeder 30 for feeding into the scanning subsystem 16. The document feeder 30 is a component of the Relia-Reader System as identified above which frictionally feeds documents individually into the scanning subsystem as the documents are needed, as is known in the art. Documents are moved through the scanning subsystem by a vacuum roller system 32, also a part of the Relia-Reader System, and also known in the art. Although the blocks of FIG. 2 are shown spaced apart, it is preferred that the actual hardware be in contiguous cabinets.

The document feeder 30 may feed documents into an Optical Character Recognition (OCR) module 34. The OCR 34, if present, reads a preprinted identification number, in this preferred embodiment. The OCR module 34 could read airbill numbers, credit card numbers or other distinctive, identifying numbers, which are preferably preprinted on the document. The procedure used in connection with the reading operation is discussed below, in connection with the scanning program. If a number is read, the OCR 34 supplies the number to a Central Processing Unit 36 (CPU) for storage. If a number is not present or cannot be read, that fact is noted as will be described below. The document is then moved from the OCR 34 to a serializer 38 by way of the vacuum roller system 32 in the preferred embodiment.

The scanning subsystem 16 optionally provides a serializer 38 to assign a control number to each document scanned. The serial number is sprayed onto the document by an ink jet sprayer in the preferred embodiment, which is a component of the ReliaReader, and known in the art. The serializer, if present, is also under the control of the CPU 36. The serializer 38 communicates the serial number that it assigned to the document to the CPU 36 for storage. The serial number can be used, for example, to track or retrieve a document that was incorrectly entered in data entry.

The document can optionally be microfilmed in a microfilming unit 40, as is known in the art. The microfilming unit 40 gives an application the option of having an easily stored and retrieved copy of the imaged documents, for use in data verification, for example.

The document is transported via the vacuum roller system 32, into a High-Speed Image Capture (HSIC) module 42. The HSIC scans the face of the document and creates a serial bit map. The pattern of light and dark is converted from an image on an element, similar to a television camera, to a serial bit map, as is known in the art.

The serial bit map thus generated may optionally be compressed by the CPU 36, using CCITT Format 3. The bit map may be compressed in order to give it a more compact size, so that it may be more rapidly transmitted. Other data compression formats can be used, such as CCITT Format 4, or no compression at all could be used. However, it should be recognized that compressing the digital data, thus decreasing the size of the data to be transmitted, decreases the time required to transmit the data needed to reproduce the document image.

The image of the document is captured and stored in the HSIC as a serial bit map, in the preferred embodiment. The image digital data may be, for example, binary raster data representing a continuous scan line where "0" bits represent white and "1" bits represent black. The raster data is organized as 8 bit bytes with each byte representing 8 consecutive pixels of data of the scan line. The ordering of bits within a byte corresponds to left-to-right scanning.

The CCITT Encoder requires that an image have a pixel count width which is modulo 8. The image size can be adjusted slightly to yield a modulo 8 byte count for each scan line at 150 dpi. A horizontal width of 8.5 inches produces 1280 pixels per scan line or 160 bytes of digital data. The record size for the compressed image raster data is programmable from the SCAN application program but is typically chosen as 8K bytes (8192 decimal bytes).

To help maintain a tracking mechanism for the records within an image, a 100 decimal byte header may be attached to each image record. The image data can be, in the preferred embodiment, organized on the tape as fixed length blocks consisting of 100 decimal bytes of header data followed by 8092 decimal bytes of compressed raster data, for a total of 8192 decimal bytes per physical tape block.

The header data may contain information that defines a record as the first record, a middle record or the last record for each image. Each image will be composed of one first record, multiple middle records, and one last record. The header may contain a record sequence number and document sequence number, picture size information and other miscellaneous information as is required for a specific application. The record sequence number can start at 1 and increment by 1 for each record over the entire tape. The document sequence number is assigned by the SCAN application program for each image but typically starts at 1 and increments by 1 for each first record type of each image. If the compressed image is small enough to fit in one record, that record is designated as an "Only One" record. The digital bit map is then compressed using CCITT format 3, in this preferred embodiment. The resulting records are 8K bytes. The headers and the records thus generated are recorded on the digital tape drive.

A video display terminal (VDT) 44, which, in this preferred embodiment, can be a high-resolution monitor, is connected to the HSIC 42, so that the VDT 44 can display documents as they are being scanned by the HSIC 42. The quality of the image generated by the HSIC 42 can thus be adjusted and checked via the VDT 44. This function can optionally be repeated at intervals during the scanning of the documents.

The document has, at this point in the preferred embodiment, been completely scanned, and is moved to a sorter 44, via a series of belts, as is known in the arts. The sorter 44 stacks scanned documents, under the control of the CPU 36, into stacks of documents.

The serial bit map is stored onto a first tape drive 48 on a first digital tape. When the first tape becomes full, then the CPU 36 switches the output to a second tape. While the second digital tape is being recorded on, the first digital tape is replaced by the operator thus increasing the speed of the scanning process. The digital tape used in this preferred embodiment is a 9 track, 2400 foot by ½ inch tape, with 6,250 bpi.

An OCR Data tape may optionally record the document serial number read by the OCR 34, and the serial number assigned by the serializer, on a first OCR data tape drive 52. The first OCR tape drive 52 is also duplex, with a second OCR tape drive 54 that can be used to record OCR data when the first tape is full.

The CPU 36 of the preferred embodiment controls and coordinates the scanning subsystem 16 under stored program (software) control. The CPU 36 controls the rate at which the documents move through the scanning system 16 by controlling the advancing mechanism of the vacuum roller system 32, as is known in the art.

A console 58 is attached to the CPU 36. The console 58 is used by an operator to start, stop, restart and generally control the operation of the scanning subsystem 16. The operator initiates a scanning operation by loading documents into the document feeder 32, and loading digital tapes onto the tape drives 48, 50, 52 and 54.

When an image data tape is full, it is rewound automatically and the operator dismounts the image data tape. The image data tape is then moved to the transmitter 18, in this preferred embodiment. Digital tapes are used in the preferred embodiment; however, a local area network could be used, for example, to convey the digital information from the scanning subsystem 16 to the transmitter 18. Other forms of data storage could be employed, for example, floppy, hard or optical disks.

Communication Subsystem

Turning now to FIG. 3, the transmitter part of the communication subsystem is shown in block diagram form at 48. The image data tape that was generated as the output of the scanning subsystem 16 is loaded onto a tape drive 60. This tape drive 60 is also compatible with 2,400 feet, 6,250 bpi tapes, such as a TU81 Tape Drive, provided by Digital Equipment Corporation, 1229 Parker Street, Maynard, Mass. 01754-2198. The tape drive 60 is connected to a microcomputer 60, such as a MicroVax II computer, also manufactured by Digital Equipment Corporation. The computer 62, in the preferred embodiment, is minimally equipped with a 159 megabyte hard disk drive, four megabytes of main memory, an Ethernet Q-BUS adapter and a video console terminal 64. The computer 62 establishes communication between the first location 14 and the second location 20, reads the compressed serial bit map from the tape and writes the digital data to a network in the preferred embodiment. The read/write function of the transmitter subsystem 48 is under software control in the preferred embodiment, as will be described hereinafter, below. The computer 62 writes the data onto a network for communication to a network bridge 66, then to a Channel Service Unit/T1 converter 68, which transmits the compressed serial bit map over a T1 carrier 70.

The network device in the computer 62 can be, for example, an Ethernet controller connected to a Q-BUS, as manufactured by Digital Equipment Corporation. The networking software used in this preferred embodiment is Decnet, as provided by Digital Equipment Corporation. The network device, in the preferred embodiment will take the data written to it by the computer 62, format the data into manageable data packets, and send the data onto the network, which is Ethernet in this embodiment, to the destination.

The network device may be connected to a network bridge 68, which acts as translator between the network and a CSU 68. In the preferred embodiment, the network bridge 66 is a TransLAN 350 version 10.1, available from Vitalink Communications Corporation, 6607 Kaiser Drive, Fremont, Calif., 34556, or the equivalent. In the preferred embodiment, the network bridge 66 is in data communication with the CSU 68, as is known in the art, and translates the Decnet data packets that it receives, determines that the data packets are for the second location 20, and forwards the data packet to the second location 20 via the CSU 68.

The data packets are received from the network bridge 66 by a Channel Service Unit 68 (CSU) and T1 converter. This CSU module 68 in the preferred embodiment connects the communication system to a T1 digital carrier line 70 for transmitting the digital data. In this preferred embodiment, the CSU 68 is a Digital Link DL 55 V1, V.35/RS 449 T1 converter and CSU, available from Digital Link Corp., 133 Caspian Court, Sunnyvale, Calif. 94089. The CSU 68 is attached to the network bridge 66 via a high speed serial interface. In the CSU 68, the signal may be converted to a 1.2 to 1.544 megabits per second T1 signal. The digital signal is then broadcast on the T1 circuit 70 as is known in the art.

The T1 circuit 70 was chosen because of its wide bandwidth. By using a dedicated T1 circuit the entire bandwidth may be used, giving the system a potential for a 1.544 megabit per second transmission. Experimentation has shown that a tape loaded with 2,000 documents of approximately 56K bytes each, takes approximately 12 minutes to transmit from a tape at the transmission end 18 to a tape at the receiving end 24. Thus, this rapid transmission of the data in digital form makes this embodiment viable. Other means of transmitting digital data over distance at high transmission rates are in keeping with this invention, such as microwave transmission, satellite and fiberoptics.

Receiving Subsystem

Figure 4:
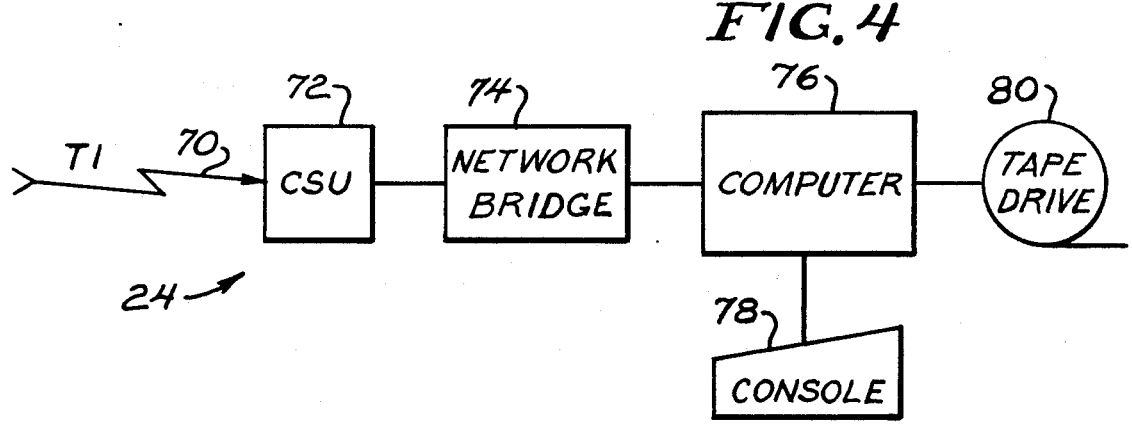
FIG. 4 is a block diagram of the receiver part of the communication subsystem of a preferred embodiment of the present invention.

Turning now to FIG. 4, the receiving end of the communications subsystem is shown generally at 24. The receiving subsystem 24 is a mirror image of the transmitting subsystem 18, in that, in the preferred embodiment, the hardware on the receiving subsystem 24 is identical to the transmitting subsystem 18. The data is received from the T1 carrier 70 and converted at a CSU 72, sent to a network bridge 74 where it is put into data packets and sent over Decnet, in the preferred embodiment. A computer 76 equipped as above, including a console 78, reads the network data packets, reassembles the data and writes the digital data to a tape drive 80. At this point, the tape on the tape drive 80 is identical to the tape that was made in the scanning subsystem 16.

Document Reproduction Subsystem

Figure 5:
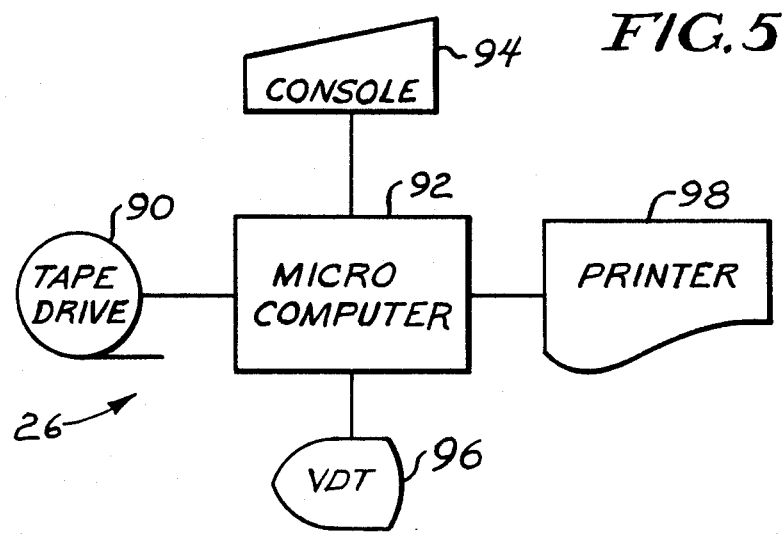
FIG. 5 is a block diagram of the printer subsystem of a preferred embodiment of the present invention.

Turning now to FIG. 5, a block diagram of the major hardware components of a document reproduction subsystem 26 of the preferred embodiment is shown. The document reproduction subsystem 26 of this preferred embodiment, including operating software, is available from Scan-Optics, 22 Prestige Park Circle, East Hartford, Conn. 06108. However, other components corresponding to each block are readily available.

The tape generated in the receiving subsystem 80, above, is mounted on a tape drive 90, and read into a microcomputer 92 one document at a time. The microcomputer 92 in the preferred embodiment is a 286 based microcomputer, as is well known in the art. A console 94 is attached to the microcomputer, as is known in the art.

When a document is in the microcomputer's memory, the digital data image of the document may be decompressed, using the reverse of the algorithm that it was compressed with. After the image of the document is decompressed, the image is enhanced, as is known in the art. For example, a Kofax KF-8200 Document Processor board from Kofax Image Products, 2691 Richton Avenue, Suite 108, Irvine, Calif. 92714, can be used to both decompress the image and convert the image to a higher resolution. This embodiment of this invention uses 4 to 1 resolution enhancement, as is known in the art. A VDT 96 may optionally be attached to the microcomputer 92. The VDT 96 may be a high resolution monitor that can display a document image, so that an operator may adjust the image. The VDT 96, if used, is connected to the microcomputer 92 via a Kofax KF-8400 monitor board, for example.

The image thus enhanced is then communicated to a printer 98 for printing in this preferred embodiment.

The printer 98 of this embodiment is a Delphax S3000 or S6000 Ion Deposition printer available from Scan-Optics. Optionally, a laser printer may be used, such as a Ricoh Laser image 3000, as sold by Scan-Optics. Other means of communication of the image to the data entry operators are in keeping with this invention, such as VDT monitors displaying each document to be entered. The final step in this system is to remove the printed material from the printer and distribute it to the data entry operators 28.

II. Control Programs

A. Scanning Subsystem Program

The scanning program controls operation of the scanning subsystem. The scanning program is resident in the memory of the CPU 36 of the scanning subsystem 16, and utilizes functions and operations of the scanning subsystem 16 operating system as provided by ScanOptics, in this preferred embodiment. Therefore, only the operation of this preferred embodiment of the scanning program will be described in connection with the scanning subsystem.

Turning now to FIG. 6, a flow chart of a first section of an embodiment of the scanning program is shown. In box 100, initialization is performed, as is known in the art, and the operator is prompted for a system configuration, as will be described below. In box 102, a document is transported into the OCR 34 for optical character recognition. The scanning program sends the scanner the first coordinates on the document to attempt to recognize a numeric character. In this embodiment, every attempt at character recognition is called a "read" for the sake of consistency with the appended program, thus this is a "first OCR read" 104. A value representing the threshold of light to dark contrast is also sent to the scanner. In the preferred embodiment, the top right corner of the document is checked first, because this is where the majority of airbill numbers are found. The OCR 34 uses the coordinates on the document as a first location for the first OCR read 104, and uses the threshold as an indication that, if the contrast between light and dark is at or above the threshold, a character has been found.

In box 106, a check is made if any characters at all were found at the first location, or whether the area was blank. If the area were blank in the test at 106, then the program branches to connector A, FIG. 6A. If characters were found at test 106 then the OCR attempts to match the character found to characters in an internally stored font. The font selected in this preferred embodiment is OCR-A, size 4 with only the numeric characters "0" through "9". Other fonts and characters could be utilized depending upon the document to be scanned. Comparison algorithm are known in the art, and the algorithm of the preferred embodiment is provided by the OCR ScanOptics System. A value denoting the number of characters successfully read and the characters themselves are returned to the scanning program.

Next, a check is made in box 108 if two or more characters were read in box 104. If one or no characters were read, it is assumed that the number is a 9-digit number, and the scanning program branches to a fourth OCR read, along connector B. If two or more numeric characters are found in box 108 then the number is assumed to be a 10 digit airbill number, in this preferred embodiment. A test is made in box 110 if 10 characters were read in box 104, and if true, the program branches to connector C; if not true, the program assumes that the number is elsewhere on the document, and proceeds through connector A.

Turning now to FIG. 6A, the scanning program continues through connector A to a second OCR read 112, which send to the OCR a second set of coordinates. In box 114, a test is made if any characters were returned by the second OCR read. If no characters were read in the second OCR read 112, it is assumed that the document being scanned is a header document. The program then branches along connector F.

A test is made in box 118 if 10 digits were returned in the second read 112. If 10 digits were returned, then the program branches along connector C. If 10 digits were not returned, then a third OCR read 120 is performed.

The third OCR read 120 uses a third set of coordinates for a third possible location of a 10 digit airbill number on the document face. In box 122, if the read in box 120 did not return any characters, then the program branches to box 126. If a 10 digit number was read successfully in box 120, then the program branches along connector C. If a 10 digit number is not read successfully in box 120, then there is not an OCR recognizable 10 digit number on the document. The program takes default action in box 126, which may include inserting ""@" into the storage area for the number. The program then branches along connector C.

Turning now to FIG. 6B, the processing of a 9 digit number is shown. Processing of nine digit numbers proceeds in a similar manner to processing of 10 digit numbers. A fourth read 128 is performed which sends to the OCR the coordinates for the most common location of a nine digit number. A check is made in box 130 if any characters were read, and, if not, the program branches to box 134. If 9 digits are read in box 132, then the program branches along connector C. If 9 digits were not read in box 128, a fifth read is performed in box 134. A check is made in box 136 if any characters were read, and, if not, the program branches to connector D. If 9 digits were successfully read in box 138, then the program branches along connector C. If 9 digits were not successfully read in box 138, then the program branches along connector D.

Turning now to FIG. 6C, a flow diagram of the 6th OCR read is shown. In box 140, a 6th and final read of the document is performed, in the preferred embodiment. It is to be understood that the number of reads will vary with the application. For example, a document with only one possible number location may only need one or two reads. The font can also be changed with each read. In the 6th OCR read of this embodiment, the font is changed to a smaller size.

In box 142, if no characters were read, then the program branches to box 146. A test is made in box 144 if 9 digits were found. If nine digits were found in box 144, then the program branches along connector C. If nine characters were not found in box 144, then the program could not read a nine digit number, and proceeds to a default routine, box 146. In box 146, the program takes default action, such as placing a series of characters, for example "@", in the storage location for the number. The program continues through connector C.

Turning now to FIG. 6D, a flow diagram starting with connector C is shown. This routine is performed for every document whether a document number was read by the OCR or not. In box 148 a count of documents is incremented. The OCR number read, if any, is stored in box 150, and, in box 152, the scanning system is prepared for imaging. A test is made in box 154 if further documents are in the document feeder. If there are, then the program branches to connector E, of FIG. 6. If there are no more documents, the program exits.

Turning now to FIG. 6E, a flow diagram of the scanning program is shown, starting with connector F. Connector F is reached when no characters were read on a second read. It is assumed, in this embodiment, that this document is a header. In box 156, the operator is prompted for batch information, in this embodiment. The batch information may be a number which uniquely identifies the batch of documents being processed. The program could optionally read a batch number, especially if the number were prefixed with a unique character string, such as "XXX" or "KKK", and located on the document in a position for which the program has coordinates.

In box 158, a check is made if the count of documents is greater than or equal to the maximum number per tape. If so, then in box 160 the tape drive is changed, and in box 162, the document count is reset to zero. The program continues through connector C.

If a jam occurs in the paper path, the operator removes the jam, removes the documents listed in the above message from the sorter 44, and loads them into the document feeder 32. The operator reconfigures the system so that the documents are only serialized and imaged, reconfigures the system, and then restarts the scanning subsystem 32.

B. Communications Programs

The communications programs control the flow of the serialized bit map from the first location 14 to the second location 20. The communications programs in this embodiment are located in the memory of the microcomputers at the sending side and the receiving side of the communications subsystem. In this preferred embodiment, the communications programs comprise a transmit program and a receive program. While it is possible to have only the transmit program in the first location 14 and the receiving program in the second location 20, it is preferred to have both the transmit and receive programs in both locations, providing the capability of future two-way image transmission.

In this embodiment, the communications programs are written in DEC MACRO language, available from Digital Equipment Corporation. The programs could be written in a higher level language that includes calls to the operating system.

Due to the nature of the operating system in the preferred embodiment, requests for a read of data from tape are handled on a first-in, first-out basis, or queued, as are requests to write data to the network. Therefore, the communications programs use a queued buffer system in a state machine in order to read the tape at a slightly higher speed as writes to the network in the transmit program, or vice-versa in the receive program. That is, since the digital data can be read from tape faster than data can be written to the network, as many reads from the tape are performed as possible at one time, and stored in an array of memory locations, which are organized into an array of buffers. The content of these buffers are then queued for writes to the network. The queue to the network is periodically checked, and buffers that have been written to the network are returned for reading from the tape.

Figure 7:
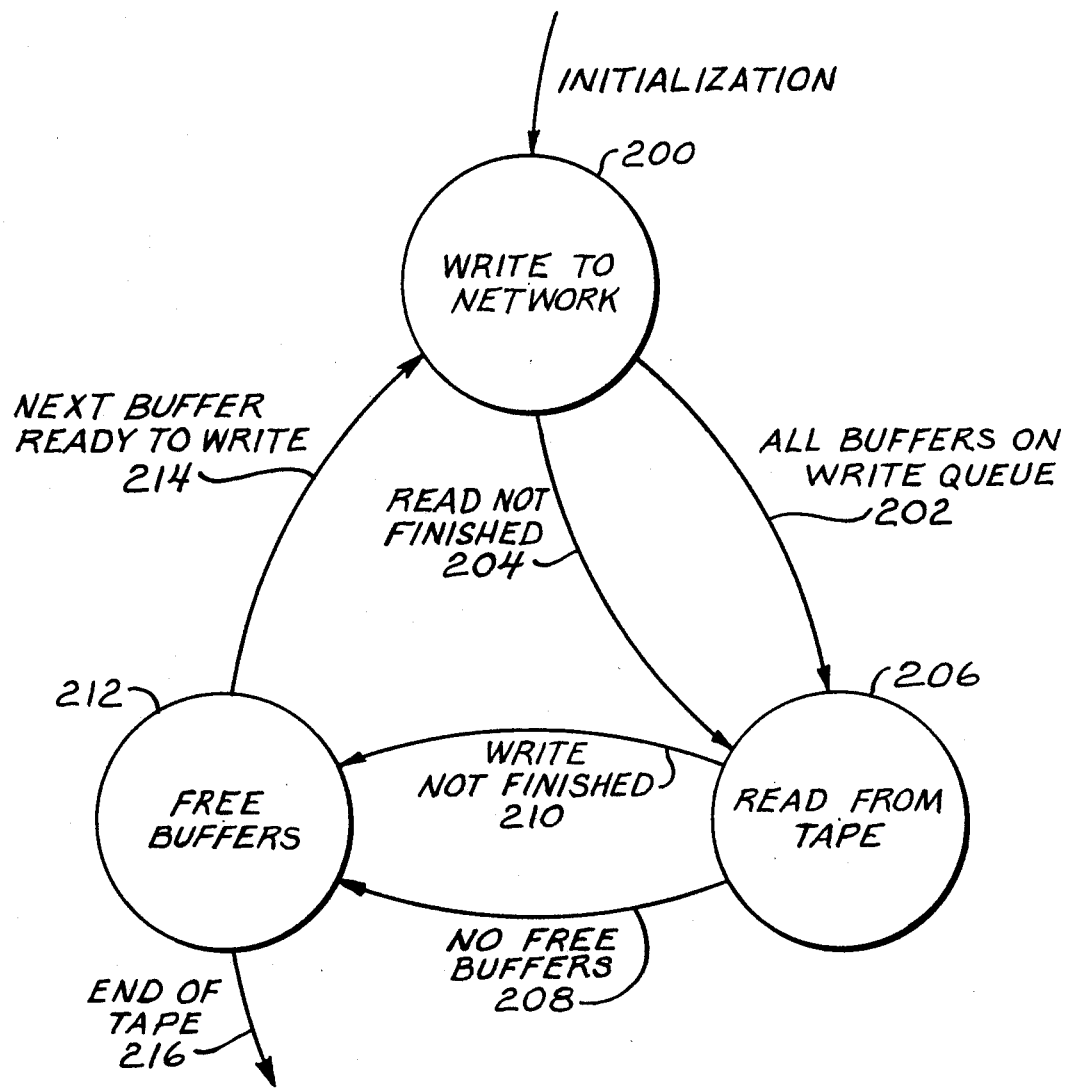
FIG. 7 is a state diagram showing the states of the transmit program and the transition conditions of a preferred embodiment of the present invention.

Turning now to FIG. 7, the three states of the tri-state machine of the communications program are shown diagrammatically, including the transition conditions. A write state is shown at 200. In the write state 200 the transmit program queues buffers of digital data to the network. The transmit program sequentially indexes through the buffers and queues the digital data contained within the buffer to be written to the network. The first transition line 202 from the write state is when the transmit program detects that the buffer it is preparing to write is already on the write queue. Also, when the transmit program determines that there is no digital data that has not previously been transmitted, it will transition along line 204 to a Read State 206.

The Read State 206 queues as many buffers sequentially as it can to read digital data from the tape. This process "streams" the tape drive, that is, keeps the tape drive moving as much as possible during the reading process, thus keeping the time needed to stop and start the tape drive to a minimum. A transition occurs along line 208 when no further buffers are available for queuing, that is, the remaining buffers are still on the writing queue. A second transition 210 occurs when the write from the buffer is not indicated finished. The Read State 206 transitions on both cases to a Free Buffer State 212.

The Free Buffer State 212 sequentially indexes through the buffers and mark all buffers free wherein the write to the network is completed, so that the buffers can be filled again in the Read State 206. A transition on line 214 from this state to the write state occurs when the free state determines that the buffer being examined contains digital data read from tape but not written to the network. The free state also performs a transition along line 216 when the end of the tape mark is encountered in this preferred embodiment.

1. Initialization.

Figure 8:
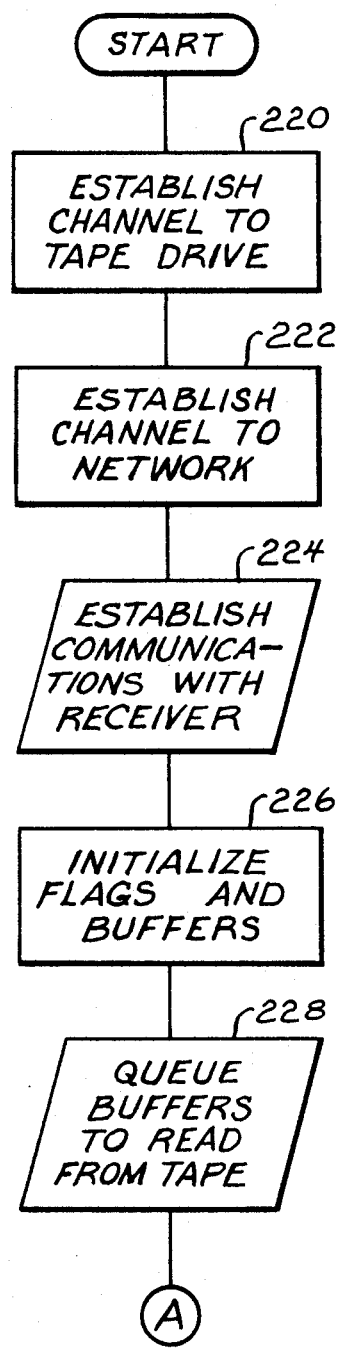
FIG. 8 is a flow chart of the initialization section of the transmit program of a preferred embodiment of the present invention.

Turning now to FIG. 8, a flow chart of the initialization section of the transmit program of this preferred embodiment is shown. The transmit program may be initiated by menu driven commands, as is well known in the art. In box 220 the transmit program establishes a channel to the tape drive as is known in the art. The tape drive is a peripheral to the microcomputer, and the operating system of the microcomputer in this embodiment uses channels for communications with peripherals. A system status of the tape drive channel is checked, and the transmit program exits if the status is incorrect. In box 222, the transmit program establishes a channel to the network. In this preferred embodiment, this channel is to the Ethernet node on the microcomputer, which establishes the connection to the rest of the communications subsystem, as discussed above in connection with FIG. 3.

The transmit program next sends a message to the receive program at the second location in box 224. At this point, the transmit program has established a through link from the tape drive to the network and the receive program on the other end. The transmit program is ready to start transmitting data from the tape to the network.

Continuing with FIG. 8, the initialization section, the transmit program in box 226 initializes the buffers and flags used in the transmit program of this embodiment, as will be described below.

In box 228, the transmit program queues half of the buffers used in digital data transfer to be loaded from the tape drive. This procedure gives the next or main part of the program digital data so that the main program has digital data to begin writing to the network. At this point, after the buffers are loaded, the program exits the initialization stages and enters the main body of the transmit program, as described above in connection with FIG. 7, and as described herein further below.

The communications programs use an array of buffers to transfer data from the tape to the network, and vice versa. The buffers are accessed using an index kept by the program. The program also uses four flags to keep track of the data within the buffers and to determine when to transition from one state to another. The program uses, in the preferred embodiment, an array of flags in one-to-one correspondence with the buffers to keep track of when the buffers are in use, called in this program IN_USE. The program keeps a flag, which is setable by the operating system, to determine if a read from tape is completed (NEXT_READ_BUFF). The program uses, in the preferred embodiment, another array of flags which are set when the buffer is queued for a write to the network (WRITE_PEND). Finally, there is a write event flag system, which is set by the operating system when the write to the network is finished (NEXT_WRT). The possible states for the flags, and hence the buffer states, are as follows:

|   | IN_USE | NEXT_READ_BUFF | WRITE_PEND | NEXT_WRT |
|---|--------|----------------|------------|----------|
| 1. | 0 | 0 | 0 | 0 |
| 2. | 1 | 0 | 0 | 0 |
| 3. | 1 | 1 | 0 | 0 |
| 4. | 1 | 1 | 1 | 0 |
| 5. | 1 | 1 | 1 | 1 |

In line 1, no flags are set, which means that the buffer is free and ready for a read from tape. This state is set by the free buffer state of FIG. 7, and initialization, box 226. In line 2, the buffer has been queued for a read from tape, but the read has not finished. This occurs in the read from tape state 206. Line 3 occurs when the read from tape completes. The buffer is ready to be queued to write the network.

Line 4 occurs when the buffer has been queued for a write to the network. This occurs in the write to network state. Line 5 occurs when the write to the network is complete. The buffer is then ready to be freed for further use in the free buffers state.

2. Main Loop

Figure 9:
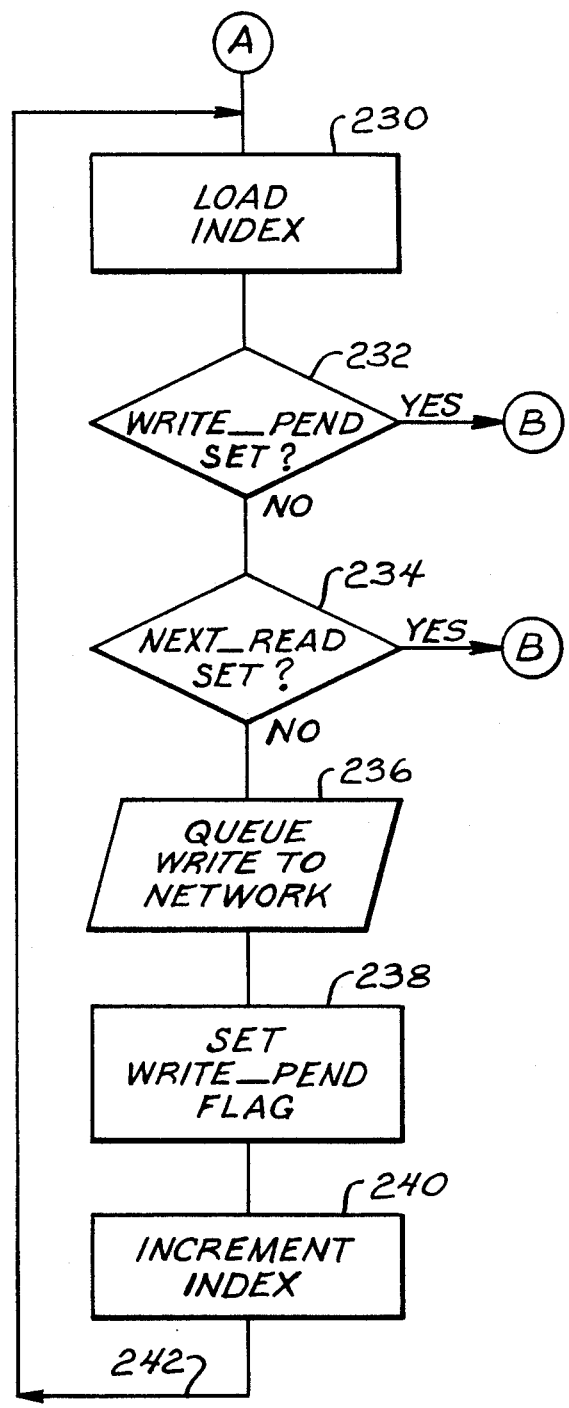
FIG. 9 is a flow chart of the MAIN_LOOP section of the transmit program of a preferred embodiment of the present invention.

Turning now to FIG. 9, a flow chart for the MAIN_LOOP is shown. The MAIN_LOOP corresponds to the network-write state in FIG. 7 above. The MAIN_LOOP, as described above, indexes through the array of buffers, writing as many buffers as it can to the network. In box 230, the MAIN_LOOP loads the index into a register for use. In box 232 the write pending flag is tested whether this buffer is already queued for a write to the network. If it is, all of the buffers are queued to the network for writing, and therefore, the program transitions to the NO_READ_COMPLETE state, along connector B.

In box 234, the program test if the NEXT_READ_BUFF flag is set. If it is not, then the program transitions to the NO_READ_COMPLETE state on connector B. If it is, then the program continues to box 236.

In box 236, the program queues the buffer for a write to the network by calling the operating systems I/0 queuing function in this embodiment, passing the address of the buffer to the function. The write pending flag is set in box 238. Finally, the program increments the index in box 240, and loops up to box 230 via line 242.

3. No Read Complete

Turning now to FIG. 10, a flow chart of the NO_READ_COMPLETE subroutine is shown. The NO_READ_COMPLETE subroutine corresponds to the Read Tape state of FIG. 7. This program attempts to fill as many buffers as possible from the tape. In box 246, the program copies the last-stored index into a register for use as an index into the buffer array. In box 248, the program checks the in use status flag to see if the buffer is in use. If it is in use, then the buffer is not available for reading, and the program transitions to the FREE_BUFFER_STATE on connector C. If the buffer is not in use, then the write complete event flag is checked in box 250. If the event flag was not clear, then the program transitions via connector C to the free buffer state. If the event flag is clear in box 250 then a system call is made in box 252 to queue the buffer for loading from the tape, and passes the address of the buffer to be loaded.

The IN_USE flag is set in box 255. The program increments the index in box 255, and loops back on line 256, to the top of the flow chart.

4. No Free Buf

Turning now to FIG. 11, a flow chart of the NO_FREE_BUF section of the transmit program is shown. This section of the program corresponds to the free buffer state of FIG. 7. The program attempts to free as many buffers as possible, making them available to the Load From Tape subroutine. The program moves an index into a register in box 258. In box 260, the NEXT_WRITE event flag is tested to determine if a write in the indexed buffer has completed. If it has not, then this buffer has good data in it, and should be queue to the network. Therefore, the program transitions along line connector A to the main_loop. If the flag is set, then digital data has successfully been transferred from the tape to the network, and, in box 262, a record counter is incremented. In box 264, a test is made to check if the end of tape marker has been encountered. If it has, then the program ends, otherwise the program increments the index in box 266, and loops to the top via line 268.

C. Receive Data

The receive program is functionally a mirror image of the transmit program. It is a state machine with three states. The only differences are that the program reads from the network instead of writing to it, and the program writes to the tape instead of reading from it.

III. Operation of the System

In the operation of the preferred embodiment, assuming that the documents being processed are overnight delivery airbills, the airbills to be processed are collected at central locations of the overnight delivery carrier, called "hubs". The airbills are collected at the hubs in the various cities, and transported in trays to a remote scanning facility of the data entry system, which is preferably located near the hub. The documents are logged into the remote scanning facility, and are assigned batch numbers.

Batch numbers may be created by connecting the customer ID, the three character airport code, the date, and a four digit number, to make the batch number unique. As each batch number is assigned, the number is checked for uniqueness, stored (for future uniqueness checks) and incremented by one for the next batch.

A batch in the airbill embodiment is generally a number of airbills one driver collects. In other applications a batch may be the number of documents a data entry operator can enter in one unit of time, depending on the number of keystrokes per document.

A batch header document may be created for each batch on a printer attached to a microcomputer, for example, or may be generated by hand. A batch header could also be generated by the service requesting business. The batch header may, in this preferred embodiment, be the same size as the documents to be scanned. The batch header number, if present, may be in a location that the OCR will read. In this case, each batch number may be prefixed by an easily recognized character string, such as "XXX" or "KKK", so that the OCR may recognize this number as a batch number. The batch header documents may be inter-leaved with the documents, as the documents are loaded into the Feeder, or may be the first document of the entire document load. The batch header may also be on a blank sheet which will stimulate interactive questions on the scanning subsystem console, as described above.

A batch of documents may first be loaded into a document "jogger" which vibrates the documents to align the edges thereof for smooth feeding into the scanning subsystem. The operator initiates a scanning session as described below, and the documents are loaded into the document feeder. The operator loads tapes onto the two duplex tape drive for gathering image and OCR Data, if required by the application.

The operator initiates a scanning operation by turning the scanning subsystem hardware on. The hardware and system software performs their respective initialization routines, and the system console displays a prompt, as is known in the art. The operator loads the scanning program from tape in this embodiment, but the scanning program may also reside on a disk drive or in read-only memory.

The scanning program in this embodiment first displays a set-up page for the operator to initialize the scanning program, and to aid in tracking and organizing documents. The scanning program of this embodiment prompts the operator for operator identification number, the current date and time. The scanning program then prompts the operator for the configuration of the various modules for the scanning session.

The OCR module may be enabled or disabled, and the separate tape drives for the OCR data may be selected. The serializer may be enabled or disabled, the microfilmer may be enabled or disabled, as well as the imaging module, the dual tape drives for the image data, and the high resolution monitor. The operator for the airbill example in the preferred embodiment, would enable all modules in the scanning subsystem except for the serialization. For other applications where there might not be a readable preprinted number, for example, the OCR module would not be enabled. The interval between displays of documents on the high resolution monitor, if enabled, can be selected from the range of 1, (display every document) to 1,000 (display every thousandth document).

The scanning program may also prompt the operator to enter parameters to be used by the scanning program. A recognition threshold may be set. Next a scaling factor in the range 0-8 may be selected. The scaling factor is dots-per-inch used by the image module in generating the digital image of the document. The scanning program prompts the operator for the number of document to load onto the tape from the range 1 to 1,700. A selection of 500 would be made, for example, as a first or early run, so that the tape will be finished in a short period of time, and thus may be transmitted to the second location. For later tapes, the number of documents selected would be the maximum number that would fill the tape, which in the airbill example is between 1700 and 2000. Finally, the scanning program prompts the operator for the number of tapes to make with the above selected quantity of documents. This would be used, for example, early in the session where short tapes are desirable. After the operator completes the selections, the scanning program sends the system data to the system, and sends the first document through the transport mechanism.

A first document in this embodiment is moved from the document feeder into the OCR module. This first document, in this embodiment, is the Batch Header document generated above. The information stored in the Batch Header number or entered by the operator in response to the scanning program, is used to form a header block on the image data tape, identifying the Batch and generating an audit trail.

In the serializer the batch header document is sprayed by an ink jet sprayer with a unique number, comprising the Julian data, which was read above as part of the Batch Header number, and a number which is a count of the number of documents, and may optionally start over with each batch. The sequence number may be used to restart the scanning subsystem after document jams, and as a reference number to look up documents if the data entry center receives an unreadable document image. The serial number from the serializer is stored in the CPU for further use. The serial number and the OCR number read previously are stored on the OCR data tape. The document is advanced to the HSIC module, and the next document is moved into the serializer.

The tape drives, as described above, are duplex, that is, two tape recording/playback units per tape drive. During the beginning of the production cycle, several tapes are produced with a small number of documents, for example 500, so that these "short" tapes can be transmitted and printed, and data entry can begin as soon as possible. The tapes are automatically rewound and unloaded by the tape drive, as is known in the art, when the maximum number of documents is reached. The other tape recording device begins to record, and a message may be printed on the console. The tape thus generated is labeled with the information generated in the console message, and the tape is physically dismounted and moved to the communications subsystem.

More than one scanning subsystem may be located at each first location, such that several scanning subsystems are generating tapes simultaneously, with each tape ending, as described above, at the end of a batch. Therefore, tapes from more than one subsystem may be sent from the communications subsystem at the first location to the second location's communications subsystem in any order. This permits economies in the number of communications subsystems needed and especially the number of dedicated digital T1 transmission lines.

The operator moves the tape from the scanning subsystem to the communications subsystem, where the tape will be put into a tape rack, as is known in the art, until it can be transmitted. The tapes will be transmitted on a first-in, first-out basis. The equipment for the communications subsystem is described above, in connection with FIG. 3.

The communications subsystem is controlled by the operator from the console of the computer, in this embodiment. The communication begins when the operator selects the initialization function. All selections are made using special function keys, as is known in the art.

Communications may begin by the transmitting program sending an initialization message to the receiving program, as described above. When this message is received, the operator of the communications subsystem at the second location, or central data entry location, will mount a tape on the tape drive of the communications subsystem at the second location and sends a return message. When the communications subsystem of the first location receives the return message from the second location, the transmission proceeds as described above, until the contents of the entire tape has been transmitted and rerecorded on the tape mounted on the communications subsystem at the second location.

When the tape is full on the communication subsystem at the second location, the receiving program prints a message on the console and rewinds and unloads the tape; which the operator then dismounts the operator mounts another tape, and repeats the communications until all of the digital information has been received.

The tapes, after being loaded, are transported to the document reproduction subsystem. The tapes may be queued for reproduction in the same order in which they are received, for example, to maintain batch sequence integrity. However, because batches of documents are not recorded on more than one tape, the order in which tapes are queued for printing may not necessarily be critical. A tape is mounted on the tape drive of the document reproduction subsystem, as described above. The microcomputer reads the digital data on the tape and performs the optional data decompression if the data were compressed by the HSIC above, and optional data enhancement. The digital data is then printed on a printer in this embodiment. In the preferred embodiment, a printer will have two paper trays of two contrasting colored papers, so that the batch header/separator pages may optionally be printed on easily identified paper. After a tape has been read and all of the digital data read, the batches of documents on paper are moved to data entry operators for data entry, which is well known in the art. Optionally, the digital image could be communicated to a monitor which a data entry operator could read and hence perform the data entry task.

While a particular embodiment of the present invention has been shown and described, modifications may be made and it is therefore intended in the appended claims to cover all such modifications as may fall within the true spirit and scope of the invention.

We claim:

1. A system for rapidly conveying the images contained on each of a plurality of documents from a first location to a second location distant from said first location, said system comprising:
   record generating means for generating a record for each document at said first location, said record including computer readable control data and a digital bit map representative of the image of each document; said record generating means including:
      optical character recognition means for reading a portion of each document and producing computer readable control data representative thereof;
      scanning means for scanning said documents to provide a serial bit map representative of the images of each document; and
      combining means for combining said control data and said serial bit map into said record;
   first recording means coupled to said record generating means for recording said records on a first storage medium;
   first reading means also at said first location for reading said records from said first storage medium;
   transmission means coupled to said first reading means for transmitting said records from said first location to said second location;
   receiving means at said second location for receiving said records
   second recording means coupled to said receiving means for recording said records on a second storage medium;
   second reading means at said second location for reading said records from said second storage medium; and
   means for reproducing said images contained on said documents coupled to said second reading means responsive to said retrieval serial bit map of digital data.

2. A system as defined in claim 1 including means for compressing said serial bit map into a compressed serial bit map at said first location, and means for recompressing said compressed serial bit map at said second location.

3. A system as defined in claim 2 wherein said printer includes a memory and said decompressing means, wherein said memory has a storage capacity for storing the compressed serial bit map corresponding to at least an entire one of said documents, and wherein said decompressing means is arranged to decompress said stored compressed data after the compressed data corresponding to one of said documents is stored in said memory.

4. A system as defined in claim 3 wherein said printer includes a second memory for storing the decompressed digital data provided by said decompressing means and wherein said printer is arranged for reproducing the images contained on said one document responsive to the decompressed digital data stored in said second memory.

5. A system as defined in claim 4 wherein said printer is arranged for storing the compressed digital data corresponding to the next successive document in said memory immediately after the compressed digital data corresponding to the immediately preceding document is decompressed by said decompressing means.

6. A system as defined in claim 1 wherein said means for reproducing said image comprises a cathode-ray tube.

7. A system as defined in claim 1 wherein said means for reproducing said images comprises a printer.

8. A system as defined in claim 7 wherein said printer comprises an ion deposition printer.

9. A system as defined in claim 7 wherein said printer comprises a laser printer.

10. A system as defined in claim 1 further including a terrestrial data link coupled between said transmission means and said receiving means for conveying said records from said first location to said second location.

11. A system as defined in claim 10 wherein said data link comprises a non-multiplexed data link.

12. A system as defined in claim 1 wherein said combining means comprises a central processing unit coupled to said optical character recognition means.

13. A system as defined in claim 12 wherein said central processing unit includes means for controlling the recording of said optical character data and said serial bit map digital data on said first storage medium and for causing said optical character data to be stored before said serial bit map digital data is stored on said first storage medium for each said document.

14. A system as defined in claim 1 including access means coupled to said first and said second reading means for accessing said control data so that each record may be individually retrieved.

15. A system as defined in claim 1 including serializing means for associating a unique serial number with a document, said serializing means being part of said record generating means.

16. A system as defined in claim 15 including adding said serial number to said computer readable control data in said record.

17. A system as defined in claim 1 further including a satellite data link coupled between said transmission means and said receiving means for conveying said records from said first location to said second location, said satellite data link including a terrestrial up-link station in data communication with said first location, and a terrestrial down-link station in data communication with said second location.

18. A system for rapidly conveying the images contained on each of a plurality of documents from a first location to a second location distant from said first location, said system comprising:

record generating means at said first location for generating a record for each document, said record including computer readable control data and a digital bit map representative of the image of each document, said record generation means including:

optical character recognition means for reading a portion of each document and producing computer readable control information representative thereof; and scanning means for scanning said documents to provide said serial bit map of digital data representative of the images contained on each said document, said scanning means including data compressing means for compressing said digital data and said record generating means further including first recording means for recording on a first storage medium said compressed digital data;

first reading means also at said first location for reading said records from said first storage medium;

transmission means coupled to said first reading means for transmitting said records from said first location at a high transmission rate;

receiving means at said second location for receiving said records;

second recording means coupled to said receiving means for recording said records on a second storage medium;

second reading means at said second location for reading said records from said second storage medium; and printing means including a memory having a capacity for storing said records corresponding to at least an entire one of said documents, means for decompressing said stored compressed digital data to retrieve the serial bit map of digital data representative of the images contained on said one entire document, and means for printing said one entire document responsive to said retrieved serial bit map, said printing means being arranged, for each said document in succession, to store in said memory the compressed digital data corresponding to that document, decompress said stored compressed digital data for that document to retrieve the serial bit map for that document and print that document responsive to said retrieved serial bit map for that document.

19. A system as defined in claim 18 wherein said printer comprises an ion printer.

20. A system as defined in claim 18 wherein said printer includes a second memory for storing the decompressed digital data provided by said decompressing means and wherein said printer is arranged for printing the images contained on said one document responsive to the decompressed digital data stored in said memory.

21. A system as defined in claim 20 wherein said printer is arranged for storing the compressed digital data corresponding to the next successive document in said memory immediately after the compressed digital data corresponding to the immediately preceding document is decompressed by said decompressing means.

22. A system as defined in claim 21 further including a terrestrial data link coupled between said transmission means and said receiving means for conveying said record from said first location to said second location.

23. A system as defined in claim 22 wherein said transmission means and said receiving means are arranged to use the entire, non-multiplexed, bandwidth of said data link.

24. A system as defined in claim 18 further including combining means for combining said optical character digital data with said compressed serial bit map digital data on said first storage medium with compressed serial bit map digital data.

25. A system as defined in claim 24 wherein said combining means comprises a central processing unit coupled to said optical character reader and said scanning means.

26. A system as defined in claim 25 wherein said central processing unit includes means for controlling the recording of said optical character data and said compressed serial bit map digital data on said first storage medium and for causing said optical character data to be stored before said compressed serial bit map digital data is stored on said first storage medium for each document.

27. A system as defined in claim 18 further including a satellite data link coupled between said transmission means and said receiving means for conveying said records from said first location to said second location, said satellite data link including a terrestrial up-link station in data communication with said first location, and a terrestrial down-link station in data communication with said second location.

28. A method for rapidly conveying the images contained on each of a plurality of documents from a first location to a second location distant from said first location, said method comprising the steps of:

generating records for each of said documents, said record including computer readable control data and a digital bit map representative of the image of each document, said generating step including the substeps of optically reading a portion of each document and producing computer readable control information representative thereof, and scanning said documents to provide a serial bit map of digital data representative of the images contained on each said document;

recording on a first storage medium said record also at said first location from said first storage medium;

reading said record also at said first location from said first storage medium;

transmitting said record from said first location;
receiving said record at said second location;
recording said record on a second storage medium;
reading said record from said second storage medium;
and reproducing said images contained on said documents responsive to said retrieved record.

29. A method as defined in claim 28 including the steps of compressing said serial bit map into a compressed serial bit map at said first location, and decompressing said compressed serial bit map at said second location.

30. A method as defined in claim 28 including the steps of enhancing said images contained on said documents before the step of reproducing said image.

* * * * *